United States Patent
Martin et al.

(10) Patent No.: US 9,787,947 B2
(45) Date of Patent: Oct. 10, 2017

(54) SURVEILLANCE SYSTEM WITH INTELLIGENTLY INTERCHANGEABLE CAMERAS

(71) Applicant: Pelco, Inc., Clovis, CA (US)

(72) Inventors: Steven D. Martin, Fort Collins, CO (US); Oscar R. Herrera, Windsor, CO (US)

(73) Assignee: Pelco, Inc., Clovis, CA (US)

(*) Notice: Subject to any disclaimer, the term of this patent is extended or adjusted under 35 U.S.C. 154(b) by 304 days.

(21) Appl. No.: 13/801,200

(22) Filed: Mar. 13, 2013

(65) Prior Publication Data

US 2014/0267745 A1     Sep. 18, 2014

(51) Int. Cl.
*H04N 7/18*       (2006.01)
*G08B 13/196*     (2006.01)
*H04N 5/33*       (2006.01)

(52) U.S. Cl.
CPC ......... *H04N 7/181* (2013.01); *G08B 13/1966* (2013.01); *G08B 13/1968* (2013.01); *G08B 13/19663* (2013.01)

(58) Field of Classification Search
CPC ............ G08B 13/196; G08B 13/19645; G08B 13/19693; H04N 7/181; H04N 5/232; H04N 5/247
USPC ........................................ 348/159
See application file for complete search history.

(56) References Cited

U.S. PATENT DOCUMENTS

| | | | | |
|---|---|---|---|---|
| 3,187,341 A | * | 6/1965 | Kubota et al. | 352/174 |
| 5,444,478 A | * | 8/1995 | Lelong et al. | 348/39 |
| 5,650,814 A | * | 7/1997 | Florent et al. | 348/39 |
| 5,982,418 A | * | 11/1999 | Ely | G08B 13/19619 348/153 |

(Continued)

FOREIGN PATENT DOCUMENTS

| | | |
|---|---|---|
| CN | 201491115 U | 5/2010 |
| EP | 2 214 145 A2 | 8/2010 |
| WO | WO 2008/088398 A2 | 7/2008 |

OTHER PUBLICATIONS

Notification of Transmittal of the International Search Report and the Written Opinion of the International Searching Authority, or the Declaration, PCT/US2014/024918, "Surveillance System With Intelligently Interchangeable Cameras", mailing date Jul. 10, 2014.

(Continued)

*Primary Examiner* — Sath V Perungavoor
*Assistant Examiner* — Howard D Brown, Jr.
(74) *Attorney, Agent, or Firm* — Hamilton, Brook, Smith & Reynolds, P.C.

(57) ABSTRACT

An embodiment of the invention provides a surveillance system with intelligently interchangeable cameras. The system includes multiple bases, each with a respective base identifier, and multiple cameras configured to learn the respective base identifiers while in proximity with a respective base. The cameras in the system are configured to employ a camera configuration corresponding with the respective learned base identifier. Each camera in the system employs the appropriate camera configuration for its placement in the system because each camera employs the camera configuration associated with the base identifier learned by the camera. This allows the cameras to be easily replaced, swapped, and moved throughout the surveillance system.

24 Claims, 6 Drawing Sheets

(56) References Cited

U.S. PATENT DOCUMENTS

| | | | |
|---|---|---|---|
| 7,584,433 B2* | 9/2009 | Kostadinovich | 715/763 |
| 7,720,251 B2* | 5/2010 | Allen et al. | 382/100 |
| 8,723,972 B2* | 5/2014 | Hinkel | H04N 7/183 |
| | | | 348/159 |
| 8,830,327 B2* | 9/2014 | Tink | H04N 7/181 |
| | | | 348/159 |
| 2002/0067411 A1* | 6/2002 | Thompson | G02B 23/2484 |
| | | | 348/207.99 |
| 2002/0186319 A1* | 12/2002 | Whitby | H04N 1/00204 |
| | | | 348/375 |
| 2003/0146974 A1* | 8/2003 | Murphy | 348/143 |
| 2003/0214602 A1* | 11/2003 | Battles | H04N 1/00204 |
| | | | 348/375 |
| 2004/0032498 A1* | 2/2004 | Wyn-Harris | G08B 13/19656 |
| | | | 348/207.1 |
| 2004/0179135 A1* | 9/2004 | Battles | H04N 1/00127 |
| | | | 348/373 |
| 2004/0233282 A1* | 11/2004 | Stavely | G08B 13/19602 |
| | | | 348/143 |
| 2005/0073575 A1* | 4/2005 | Thacher | H04N 7/141 |
| | | | 348/14.13 |
| 2005/0206726 A1* | 9/2005 | Yoshida et al. | 348/143 |
| 2006/0033813 A1* | 2/2006 | Provinsal et al. | 348/143 |
| 2006/0066753 A1* | 3/2006 | Gennetten | H04N 1/00127 |
| | | | 348/375 |
| 2006/0171695 A1* | 8/2006 | Jung et al. | 396/56 |
| 2007/0039030 A1* | 2/2007 | Romanowich et al. | 725/105 |
| 2007/0052804 A1* | 3/2007 | Money et al. | 348/143 |
| 2007/0126871 A1* | 6/2007 | Henninger et al. | 348/151 |
| 2007/0126872 A1* | 6/2007 | Bolotine et al. | 348/151 |
| 2008/0080550 A1* | 4/2008 | Malik | G06F 9/4411 |
| | | | 370/465 |
| 2009/0134973 A1* | 5/2009 | Sandler | G06F 21/85 |
| | | | 340/10.1 |
| 2009/0245268 A1* | 10/2009 | Pugliese, IV | 370/401 |
| 2010/0153770 A1* | 6/2010 | Lee | H04N 7/181 |
| | | | 714/4.1 |
| 2010/0295960 A1* | 11/2010 | Furlan | H01R 13/6683 |
| | | | 348/222.1 |
| 2011/0043629 A1* | 2/2011 | Owen et al. | 348/143 |
| 2011/0085041 A1* | 4/2011 | Kildevaeld | 348/158 |
| 2011/0162035 A1* | 6/2011 | King | G06F 1/1632 |
| | | | 726/1 |
| 2012/0194336 A1* | 8/2012 | Thiruvengada | G08B 13/19645 |
| | | | 340/525 |
| 2012/0229648 A1* | 9/2012 | Kass | 348/159 |
| 2013/0055363 A1* | 2/2013 | Dattagupta et al. | 726/5 |
| 2013/0086633 A1* | 4/2013 | Schultz | H04L 9/00 |
| | | | 726/2 |
| 2013/0304959 A1* | 11/2013 | Chiang | 710/303 |

OTHER PUBLICATIONS

International Preliminary Report on Patentability for International Application No. PCT/US2014/024918, entitled "Surveillance System with Intelligently Interchangeable Cameras," Date of issuance: Sep. 15, 2015.

* cited by examiner

SURVEILLANCE SYSTEM WITH INTELLIGENTLY INTERCHANGEABLE CAMERAS

BACKGROUND OF THE INVENTION

In general, there has been an increased use of surveillance cameras and related systems. Not only has the extent of surveillance systems increased in traditional venues such as banks, the use of surveillance cameras has become more widespread throughout society. Most commercial entities, and many homeowners, employ some form of surveillance system for both external and internal monitoring.

SUMMARY OF THE INVENTION

A system and corresponding method, according to an embodiment of the present invention, provide a surveillance system, more specifically, a surveillance system with intelligently interchangeable cameras. An embodiment of the present invention includes multiple bases each having a respective base identifier. The system further includes cameras configured to be interchangeably coupled to the multiple bases. Within the system, a given camera is configured to learn a respective base identifier while in proximity with a given base and is further configured to employ a camera configuration corresponding to the respective base identifier.

An embodiment of the present invention further includes a system controller which has access to camera configuration information associated with the respective base identifiers. According to an embodiment of the invention, the system controller is communicatively coupled to the cameras and provides camera configuration information to the cameras. In another embodiment, the cameras are configured to transmit the learned base identifier to the system controller and, in response, receive camera configuration information that corresponds to the transmitted base identifier. In yet another embodiment, the cameras are configured to modify their respective camera configuration information to comply with the received camera configuration information. According to another embodiment of the invention, the cameras are communicatively coupled to the system controller and each camera is configured to transmit a signal to the system controller when a camera is removed from a base. In an embodiment of the present invention, the system controller is configured to generate a flag when the system controller receives a signal indicating a camera has been removed from a base.

Further embodiments provide for intelligent bases. According to one such embodiment, the system controller is communicatively coupled to the bases, and the bases are, in turn, configured to transmit a signal to the system controller, which indicates that a camera has been removed from the base. In yet another embodiment, the system controller is configured to generate a flag when it receives a signal indicating a camera has been removed from a base. Another embodiment of the present invention employs a system controller that creates a log of camera/base pairings within the surveillance system.

In an alternative embodiment of the present invention, the system controller is configured to transmit camera configuration information periodically to the cameras within the system. In such an embodiment, the cameras are configured to employ the corresponding camera configuration while in proximity with a base.

An embodiment of the present invention utilizes cameras configured to learn a respective base identifier while the cameras are mechanically coupled to a base. Further embodiments of the invention provide a surveillance system with more bases than cameras or more cameras than bases and, alternatively, a system where each camera can be mechanically coupled to every base. Other example embodiments include cameras that utilize battery power, and communicate control and data wirelessly.

Further embodiments provide for bases which store the respective base identifiers on a Radio Frequency Identification (RFID) tag coupled to each base, and the cameras can read the RFIDs wirelessly.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The increased use of surveillance systems has brought with it increased surveillance system complexity. Many surveillance systems include numerous cameras, each with corresponding software that allows the camera to operate with a particular camera configuration. A camera's configuration typically varies depending upon the placement of the camera, the role of the camera in the system, and also the overall goals of the surveillance system. Surveillance system setup and maintenance has become increasingly expensive and complex because of the vast size of surveillance systems and because of the labor needed to employ various camera configurations.

System maintenance has become correspondingly burdensome as well. After system setup, should a camera need to be replaced, the replacement camera needs to be particularly configured based upon where it is being placed within the system. This requires intervention by a party with both network and system configuration skills and knowledge. The complexity involved in camera replacement also yields downtime in data collection, leaving the system open to possible vulnerabilities.

Figure 1:
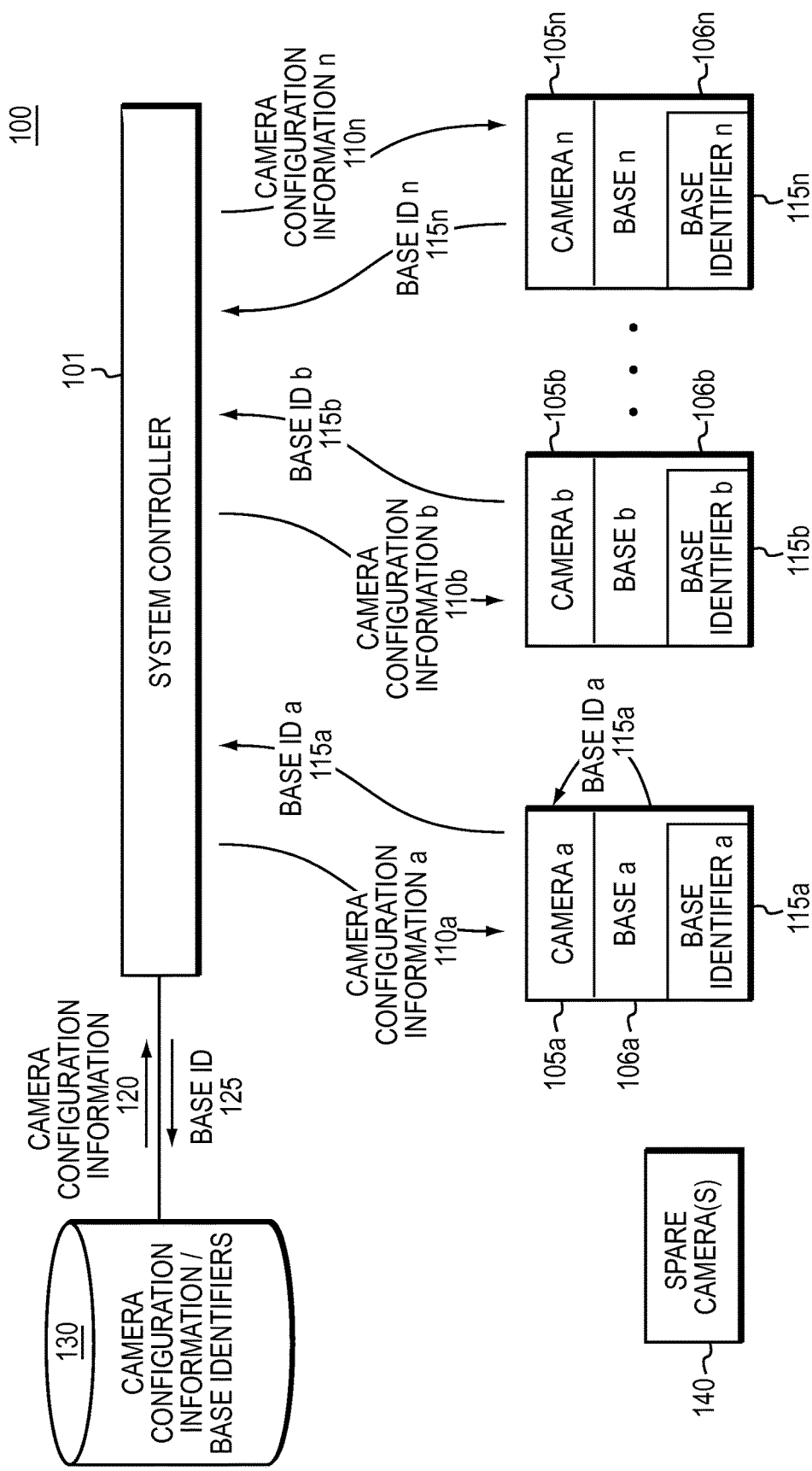
FIG. 1 is a simplified block diagram of a surveillance system having cameras, bases, and a system controller associated therewith, according to an embodiment of the present invention.

FIG. 1 illustrates a simplified block diagram of a surveillance system 100 according to an embodiment of the present invention. The system 100 includes a system controller 101, cameras 105a-n, and bases 106a-n. Each base 106a-n has associated therewith a respective base identifier 115a-n. According to an embodiment of the invention, the cameras 105a-n can be coupled mechanically, electrically, communicatively, or a combination thereof, to the bases 106a-n. Further included in the system 100 are spare cameras 140 and a storage device 130, which is configured to store among other data, camera configuration information and corresponding base identifiers.

The respective base identifiers 115a-n are each associated with a camera configuration. It should be noted that while each base 115a-n has an associated base identifier 115a-n, it is not necessary that the base identifiers 115a-n be unique. While unique identifiers may be advantageous, for example, so that camera/base pairings may be fully tracked and logged, a more simplistic system may utilize fewer unique base identifiers than corresponding bases. Such a system functions such that base identifiers are shared by bases where the same camera configuration is appropriate.

In an embodiment of the present invention, the above-described elements are configured to provide a surveillance system with intelligently interchangeable cameras. For example, in an embodiment, the system 100 has multiple bases 106a-n. Each base 106a-n has an associated base identifier 115a-n. Within the system 100, a given camera, such as the camera 105a, is configured to learn a base identifier, such as the base identifier 115a, when in proximity with the base 106a. After the camera 105a has learned the base identifier 115a, the camera 105a employs a camera configuration corresponding to the respective base identifier 115a.

According to an embodiment of the invention, the system controller 101 has access to the camera configuration information and the respective base identifiers. The system controller 101 may have access to this information from a storage device, such as the storage device 130 shown. The storage device 130 may be remotely or locally located with respect to the system controller 101. The storage device 130 may alternatively be within the system controller 101 or simply coupled thereto. The system controller 101 may be communicatively coupled to the cameras 105a-n. In an embodiment in which the cameras 105a-n are communicatively coupled to the system controller 101, the system controller 101 may provide respective camera configuration information, such as the camera configuration information 110a-n to the cameras 105a-n.

In an alternative embodiment of the invention, upon learning a respective base identifier, such as the base identifier 115a, the camera 105a may transmit the learned base identifier 115a to the system controller 101. After the system controller 101 has received the base identifier 115a, the system controller 101 may transmit the base identifier 115a, to the storage device 130. This is depicted in FIG. 1 as a base identifier transmission 125. Next, the system controller 101 obtains the respective camera configuration information 110a, depicted as a camera configuration information transmission 120, from the storage device 130. After obtaining the camera configuration information 110a, the system controller 101 transmits the camera configuration information 110a to the camera 105a. While FIG. 1 depicts this process as involving transmissions outside of the system controller 101, the system controller 101 may simply store camera configuration information and respective base identifiers within the system controller 101 itself. Upon receiving the camera configuration information 110a, the camera 105a is configured to modify, if need be, its camera configuration to comply with the received camera configuration information 110a.

An alternative embodiment of the invention uses a system controller, such as the system controller 101, that is configured to transmit camera configuration information 110a-n periodically to the cameras 105a-n. In an embodiment, the system controller 101 periodically transmits camera configuration information 110a-n, based upon received base identifiers 115a-n. Another embodiment operates without the transfer of base identifiers 115a-n to the system controller 101. In such an embodiment, the cameras, such as the cameras 105a-n, learn the respective base identifiers 115a-n, when in proximity with the respective bases 106a-n. The system controller, such as the system controller 101, periodically transmits camera configuration information; however, in this embodiment, the system controller transmits all of the possible camera configurations in the system 100 to the cameras 105a-n. The cameras 105a-n then only employ the camera configuration that corresponds with the respective learned base identifier 115a-n.

An alternative embodiment of the invention provides a surveillance system without a system controller. In such an embodiment, the cameras, such as the cameras 105a-n, have access to the all of the possible camera configurations in the system. In the embodiment where the cameras, such as the cameras 105a-n, have access to all of the camera configuration information, the cameras simply employ the respective camera configuration upon learning the respective base identifier when in proximity with a respective base.

In another embodiment of the present invention without a system controller, the bases, such as the bases 106a-n, each knows the respective camera configuration that a camera, such as the cameras 105a-n, should employ when in proximity with the bases 106a-n. In this embodiment, when a given camera is in proximity with a base, such as the base 106a, the base 106a transmits the appropriate camera configuration information to the camera, such as the camera 105a, and the camera 105a modifies its camera configuration to comply with the received camera configuration information.

Embodiments of the present invention also provide for system configuration information logging and tracking. This is accomplished by one such embodiment wherein the system controller 101 is communicatively coupled to the bases 106a-n. The bases 106a-n are, in turn, configured to transmit a signal to the system controller 101 when a camera, such as one of the cameras 105a-n, is removed from the bases 106a-n. According to yet another embodiment that provides for system configuration information logging and tracking, the system controller 101 is communicatively coupled to the cameras 105a-n and the cameras 105a-n are configured to transmit a signal to the system controller 101 when a given camera, such as the camera 105a, is removed from a given base, such as the base 106a. In response to receiving a signal that a camera has been removed from a base, the system controller 101 generates a flag indicating that a camera has been removed from a base. In yet another embodiment of the invention, the system controller 101 generates a log of camera/base pairings.

As described above, according to an embodiment of the invention, the cameras 105a-n are each configured to learn the respective base identifiers 115a-n while in proximity with the bases 106a-n. In an alternative embodiment of the invention, the cameras 105a-n are configured to learn the respective base identifiers 115a-n while mechanically coupled to the respective bases 106a-n. Such a system ensures that the cameras 105a-n learn only the appropriate base identifiers 115a-n. This functionality is particularly advantageous where bases are in close proximity to one another.

Another embodiment of the invention is a surveillance system with more bases than cameras or alternatively, more cameras than bases. In such an embodiment, the cameras can be coupled to all of the bases because each camera is configured to learn a respective base identifier and employ a camera configuration associated with the base identifier. Such a system is particularly advantageous where the cameras need to be swapped or moved often, such as with wireless or battery powered cameras.

Figure 2:
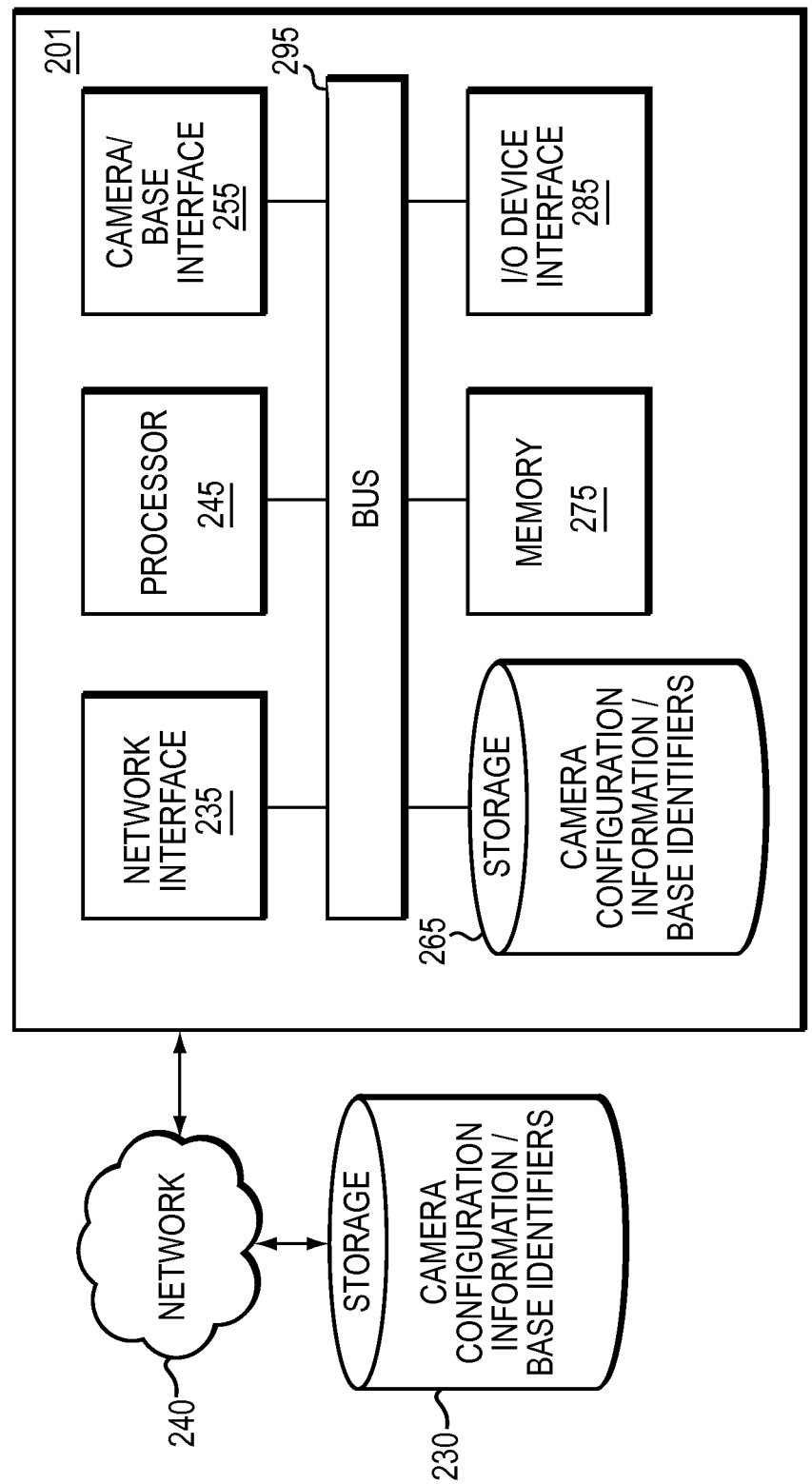
FIG. 2 is a simplified block diagram of a system controller according to an embodiment of the present invention.

FIG. 2 is a simplified block diagram of a system controller 201 according to an embodiment of the present invention. The system controller 201 contains a bus 295. The bus 295 is a connection between the various components of the system controller 201. Connected to the bus 295 is an input/output device interface 285 for connecting various input and output devices, such as a keyboard, mouse, display, speakers, etc. to the system controller 201. A processor 245 is connected to the bus 295 and provides for the execution of computer instructions. Memory 275 provides volatile storage for data used for carrying out computer instructions. Storage 265 provides non-volatile storage for software instructions, such as an operating system (not shown) and data, such as camera configuration information and base identifiers.

The system controller 201 also includes a network interface 235 for receiving data, such as camera configuration information, and sending data, such as base identifiers, to and from storage devices, such as the storage device 230 via the network 240. Additionally, the network interface 235 may allow for communications with other system controllers (not shown), servers (not shown), computers (not shown), and any other points in or able to be connected to the network 240. The network 240 may be any such network that is known in the art, including, for example, a Local Area Network (LAN) or a Wide Area Network (WAN).

Further coupled to the system controller 201 is a camera/base interface 255. According to an embodiment of the invention, the system controller 201 communicates with cameras, such as the cameras 105a-n, through the camera/base interface 255. The system controller 201 may receive base identifier information via the camera/base interface 255. Further, the system controller 201 may communicate camera configuration information to cameras, either in response to a received base identifier or simply periodically, through the camera/base interface 255.

Figure 3:
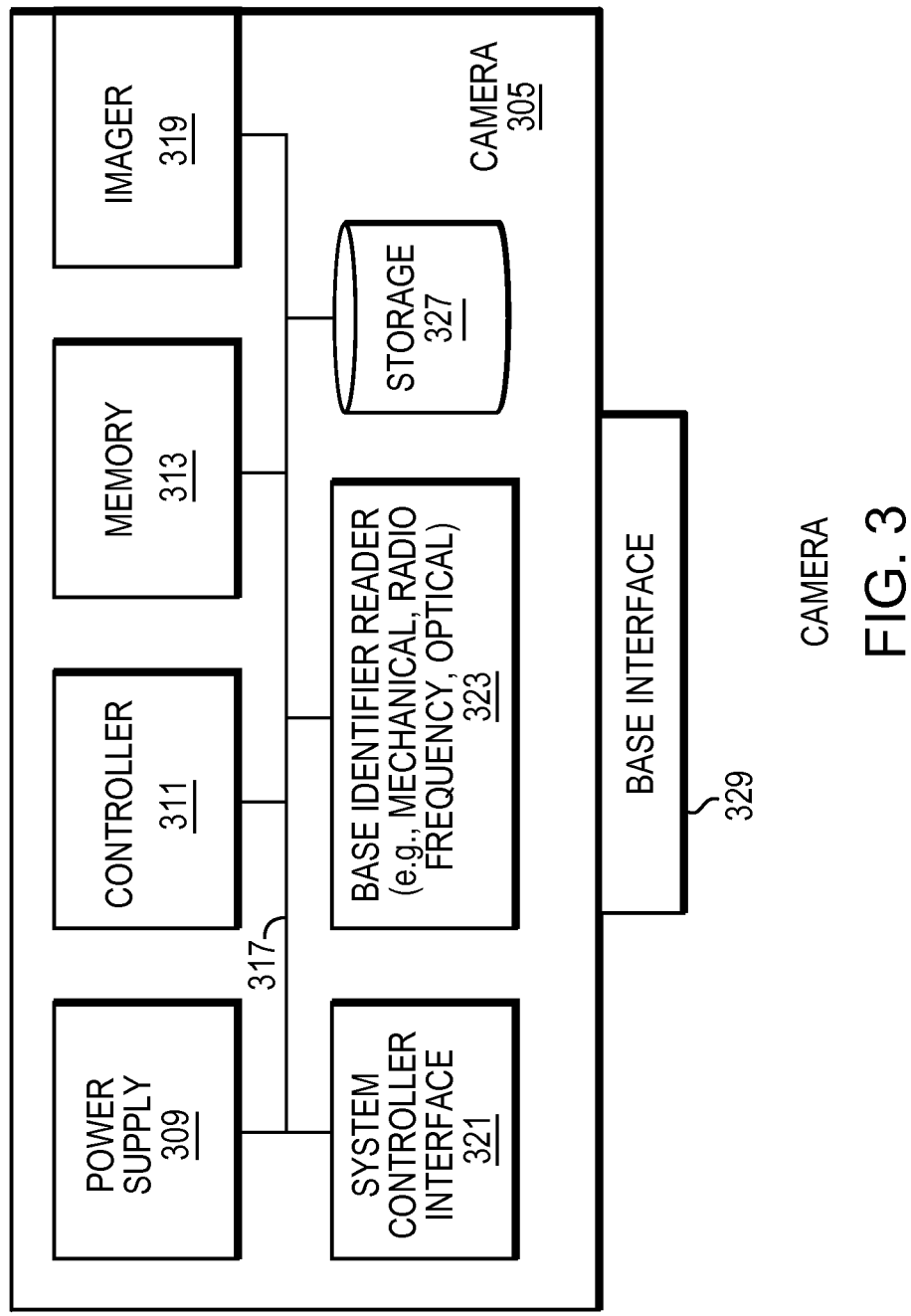
FIG. 3 is a simplified block diagram of a camera that may be employed in an embodiment of the invention.

FIG. 3 is a simplified block diagram of a camera 305 that may be employed in an embodiment of the invention, such the system 100. The camera 305 includes an interconnection 317, which may be a bus, which allows for the interconnection of the various components of the camera 305. The camera 305 includes a power supply 309 for supplying power to the camera 305. The power supply 309 may be a battery, or may also be a power interface that allows the camera 305 to be connected to a power grid. Further coupled to the camera is an imager 319 for capturing images.

The camera 305 also comprises a controller 311. The controller 311 allows the camera 305 to employ a particular camera configuration. Further coupled to the camera 305 is memory 313. The memory 313 serves as volatile storage for instructions, base identifier information, and/or camera configuration information. The camera 305 also includes non-volatile storage 327, which may store instructions, base identifier information, and/or camera configuration information.

Further included in the camera 305 is a base identifier reader 323 for determining a base identifier when the camera 305 is in proximity with a given base. The base identifier reader 323 may be configured to determine a respective base identifier through any means known in the art, including mechanical, electrical, radio frequency, and optical methods.

The camera 305 further comprises a system controller interface 321. The system controller interface 321 permits the transmission and reception of data between the camera 305 and a system controller, such as the system control 201. The transmitted and received data may include base identifiers and camera configuration information. This data exchange may occur as described hereinabove in relation to FIG. 1.

Finally, the camera 305 has a base interface 329. The base interface 329 allows the camera 305 to be coupled to a base, such as the base 106a (FIG. 1). In an embodiment of the invention, the camera 305 is configured to learn a respective base identifier only when mechanically coupled via the base interface 329 to a base.

Figure 4:
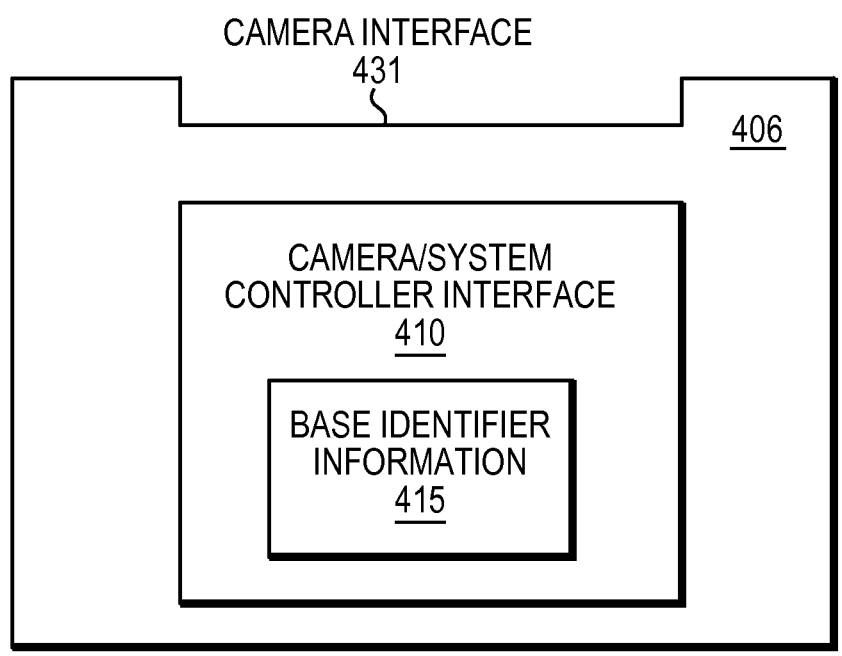
FIG. 4 is a simplified block diagram of a base that may be utilized in an embodiment of the present invention.

FIG. 4 is a block diagram of a base 406 according to an embodiment of the present invention. The base 406 comprises a camera/system controller interface 410. The camera/system controller interface 410 allows communications between the base 406 and cameras, such as the cameras 105a-n (FIG. 1), and the system controller, such as the system controller 101 (FIG. 1). Such communications may include base identifier information, camera configuration information, and camera/base pairing information. Further coupled to the base 406 is base identifier information 415. The base identifier information 415 may be stored according to any means known in the art, including within a Radio Frequency Identification (RFID) tag.

The base 406 is configured to have an interface 431 that allows a camera, such as the camera 305, to be coupled to the base 406. The camera interface 431 may be configured to provide for the mechanical coupling of the base 406 to a camera.

Figure 5:
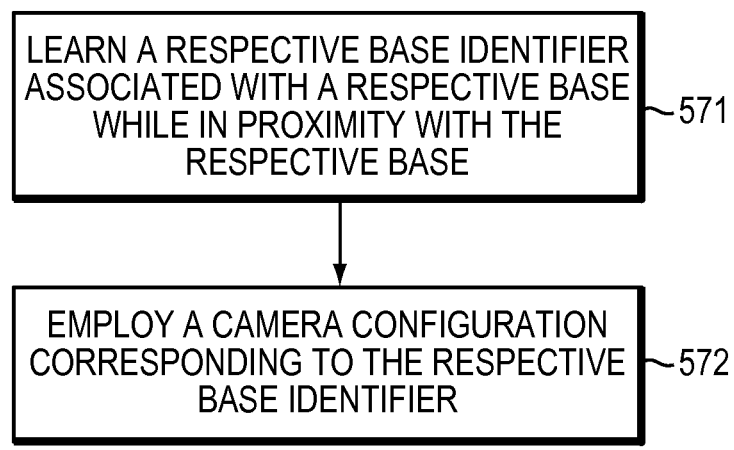
FIG. 5 is a flowchart depicting a method that a camera may be configured to follow according to an embodiment of the present invention.

FIG. 5 is a flowchart depicting a method that cameras, such as the cameras 105a-n, may be configured to follow. The method 570 begins with learning a respective base identifier associated with a respective base while in proximity with the respective base (571). "Proximity" as used herein means when the camera is simply near a base (e.g., within RFID range) or when it is actually mechanically coupled to said base. Next, after learning the respective base identifier, a camera is configured to employ a camera configuration associated with the respective base identifier (572). The employed camera configuration may be derived from camera configuration information that is transferred to the camera from a system controller in response to a transmitted base identifier. Alternatively, the camera configuration may be transferred from the system controller to the camera periodically. In another embodiment, the base transfers camera configuration information for the camera to employ by the camera. According to yet another embodiment, the camera may have stored thereon, or have remote access to, camera configuration information. In such an embodiment, upon learning a respective base identifier, the camera simply accesses the stored camera configuration information and then employs the camera configuration information corresponding with the learned respective base identifier.

Figure 6:
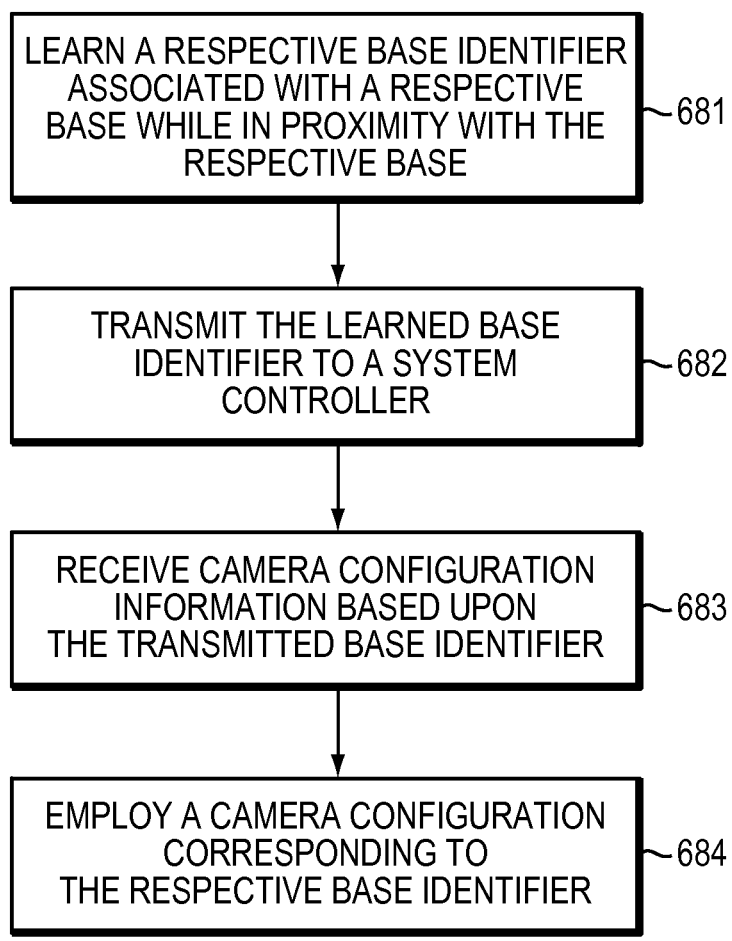
FIG. 6 is a flowchart depicting a method that a camera may be configured to follow according to an embodiment of the present invention.

FIG. 6 is a flowchart of a method 680 that a camera may be configured to follow according to an embodiment of the invention. First, a camera learns a respective base identifier associated with a respective base while in proximity with the base (681). Next, the camera transmits the learned base identifier to the system controller (682). The camera then receives camera configuration information based upon the transmitted base identifier (683). Finally, the camera employs a camera configuration corresponding to the respective base identifier (684), which was received from the system controller.

It should be understood that the example embodiments described above may be implemented in many different ways. In some instances, the various methods and machines described herein may each be implemented by a physical, virtual, or hybrid general purpose computer. A computer may be transformed into the machines that execute the methods described above, for example, by loading software instructions into either memory or non-volatile storage for execution by a central processing unit (CPU).

Embodiments or aspects thereof may be implemented in the form of hardware, firmware, or software. If implemented in software, the software may be stored on any non-transient computer-readable medium that is configured to enable a processor to load the software or subsets of instructions thereof. The processor then executes the instructions and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A surveillance system, comprising:
   a plurality of bases having associated therewith respective base identifiers, each base being in a respective location;
   a plurality of interchangeable cameras configured to be coupled to any of the plurality of bases, and a given camera configured to learn a respective base identifier while in proximity with a given base and to automatically employ a stored camera configuration corresponding to the respective base identifier, the employed stored camera configuration causing the given camera to be configured based upon the location of the given base; and
   a surveillance system controller having access to stored camera configuration information, the stored camera configuration information including stored camera configurations being based on the respective locations of the bases and associated with the respective base identifiers, the surveillance system controller being communicatively coupled to the plurality of interchangeable cameras to automatically provide the stored camera configuration information to any of the plurality of interchangeable cameras.

2. The system of claim 1 wherein the plurality of interchangeable cameras are configured to transmit the learned base identifier to the surveillance system controller and to receive the corresponding stored camera configuration information based upon the transmitted base identifier.

3. The system of claim 2 wherein the plurality of interchangeable cameras modify their respective camera configuration to comply with the received stored camera configuration information.

4. The system of claim 1 wherein the surveillance system controller is communicatively coupled to each base and wherein each base is configured to transmit a signal to the system controller indicating an interchangeable camera has been removed from a base.

5. The system of claim 4 wherein the surveillance system controller generates a flag when the signal indicating an interchangeable camera has been removed from a base is received.

6. The system of claim 1 wherein each interchangeable camera is configured to transmit a signal to the surveillance system controller indicating an interchangeable camera has been removed from a base.

7. The system of claim 6 wherein the surveillance system controller generates a flag when the signal indicating an interchangeable camera has been removed from a base is received.

8. The system of claim 1 wherein the surveillance system controller creates a log of camera/base pairings.

9. The system of claim 1 wherein the surveillance system controller is configured to provide the stored camera configuration information periodically to the interchangeable cameras in the system and each interchangeable camera is configured to comply with the stored camera configuration information while in proximity with a base.

10. The system of claim 1 wherein the plurality of interchangeable cameras are configured to learn the respective base identifier associated with a base when the interchangeable camera is mechanically coupled to the base.

11. The system of claim 1 wherein the system includes more bases than interchangeable cameras or more interchangeable cameras than bases.

12. The system of claim 1 wherein each interchangeable camera can be mechanically coupled to every base.

13. The system of claim 1 wherein the respective base identifiers are each stored on a Radio Frequency Identification (RFID) tag coupled to each base.

14. The system of claim 1 wherein the plurality of interchangeable cameras are wireless interchangeable cameras.

15. The system of claim 1 wherein the plurality of interchangeable cameras are battery powered.

16. A method for providing a surveillance system, the method comprising:
    by a given camera, among a plurality of interchangeable cameras configured to be coupled toe any of the plurality of bases, each base being in a respective location:
      learning a respective base identifier associated with a respective base while in proximity with the respective base;
      receiving stored camera configuration from a surveillance system controller, the stored camera configuration being associated with the respective base identifier and corresponding to the location of the respective base, the surveillance system controller being communicatively coupled to the plurality of interchangeable cameras to automatically provide stored camera configuration information to any of the plurality of interchangeable cameras; and
      employing the stored camera configuration associated with the respective base identifier, the employed stored camera configuration causing the given camera to be configured based upon the respective location of the base.

17. The method of claim 16 further comprising:
    transmitting the learned base identifier to the surveillance system controller; and receiving the stored camera configuration information based upon the transmitted base identifier.

18. The method of claim 17 further comprising:

modifying a previous camera configuration to comply with the received camera configuration information.

19. The method of claim 16 further comprising:

causing a base to transmit a signal to the surveillance system controller indicating an interchangeable camera is removed from the base.

20. The method of claim 19 further comprising:

causing the surveillance system controller to generate a flag in response to receiving the signal indicating that the interchangeable camera was removed from the base.

21. The method of claim 16 further comprising:

causing an interchangeable camera to transmit a signal to the surveillance system controller indicating the interchangeable camera is removed from a base.

22. The method of claim 21 further comprising:

causing the surveillance system controller to generate a flag in response to receiving the signal indicating that the interchangeable camera was removed from the base.

23. The method of claim 16 further comprising:

causing the surveillance system controller to create a log of camera/base pairings.

24. A non-transitory computer readable medium having stored thereon a sequence of instructions which, when loaded and executed by a processor coupled to a given camera, causes the given camera to:

learn a respective base identifier associated with a respective base while in proximity with the respective base, each base being in a respective location;

receive a stored camera configuration from a surveillance system controller, the stored camera configuration being associated with the respective base identifier and corresponding to the location of the respective base, the surveillance system controller being communicatively coupled to a plurality of interchangeable cameras to automatically provide the stored camera configuration information to any of the plurality of interchangeable cameras; and employ the stored camera configuration associated with the respective base identifier, the employed stored camera configuration causing the given camera to be configured based upon the location of the respective base.

* * * * *